W. H. SODEAU.
HEATING OF COMPRESSED AIR FOR USE IN MOTORS.
APPLICATION FILED MAR. 25, 1907.

944,975.

Patented Dec. 28, 1909.
2 SHEETS—SHEET 1.

ATTEST.

INVENTOR.
WILLIAM H. SODEAU.

W. H. SODEAU.
HEATING OF COMPRESSED AIR FOR USE IN MOTORS.
APPLICATION FILED MAR. 25, 1907.

944,975.

Patented Dec. 28, 1909.
2 SHEETS—SHEET 2.

ATTEST.
Benth. Stahl.
Earl A. Tolson.

INVENTOR.
WILLIAM H. SODEAU.
By Spear, Middleton, Donaldson & Spear

UNITED STATES PATENT OFFICE.

WILLIAM HORACE SODEAU, OF NEWCASTLE-UPON-TYNE, ENGLAND, ASSIGNOR TO W. G. ARMSTRONG WHITWORTH & COMPANY, LIMITED, OF NEWCASTLE-UPON-TYNE, ENGLAND.

HEATING OF COMPRESSED AIR FOR USE IN MOTORS.

944,975.      Specification of Letters Patent.     Patented Dec. 28, 1909.

Application filed March 25, 1907. Serial No. 364,519.

*To all whom it may concern:*

Be it known that I, WILLIAM HORACE SODEAU, a subject of the King of Great Britain and Ireland, residing at Elswick Works, Newcastle-upon-Tyne, in the county of Northumberland, England, have invented certain new and useful Improvements Relating to the Heating of Compressed Air for Use in Motors, of which the following is a specification.

This invention relates to apparatus used for increasing the energy of compressed air which is to be used for motive power, e. g., in automobile torpedoes, pneumatic drills and the like. In such apparatus air is passed to a combustion chamber and some of it is used to support the combustion of a fuel therein, usually a liquid fuel.

The objects of the present invention are to effect increased safety reliability and efficiency in a compact air heating device.

Figure 1:
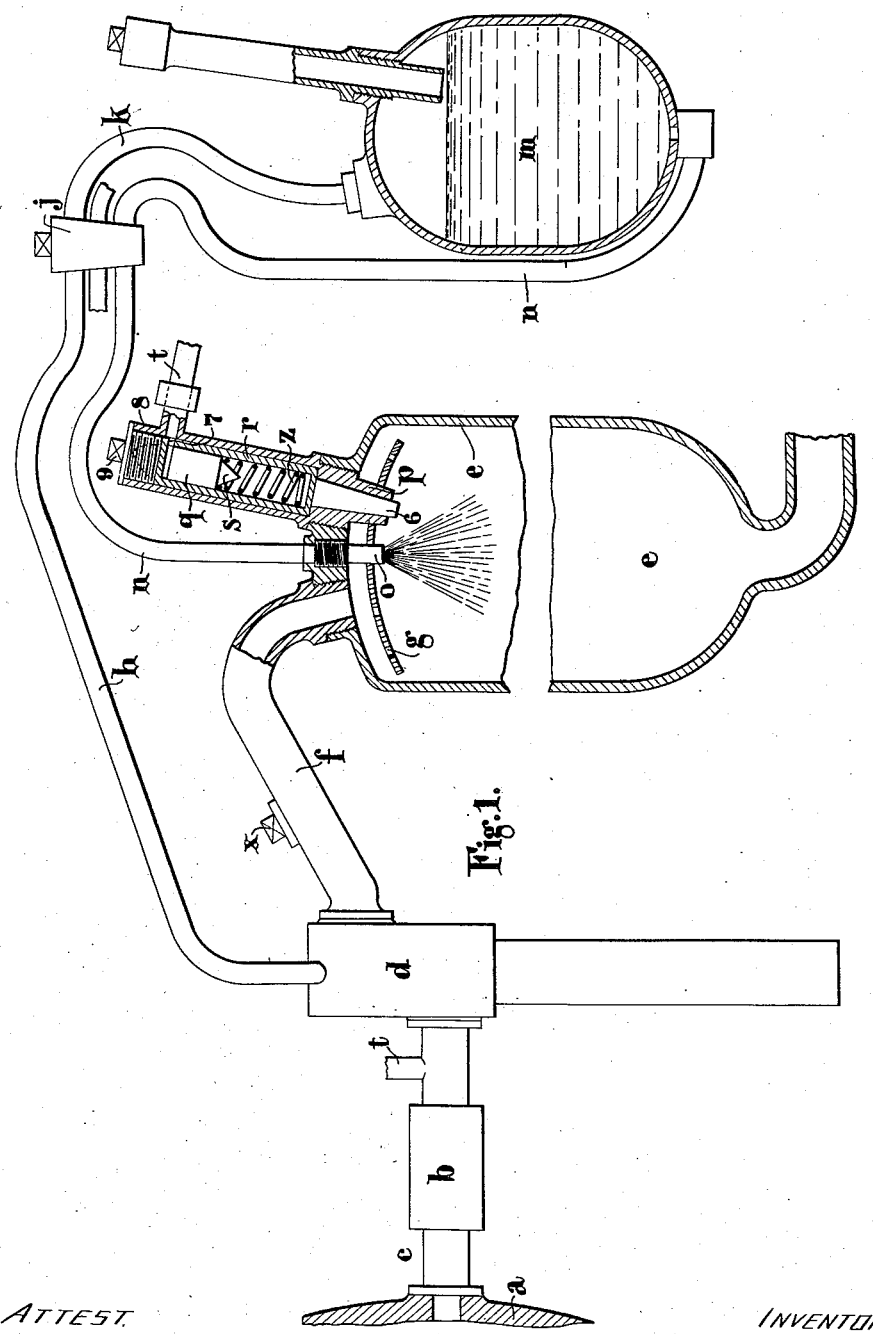
Figure 2:
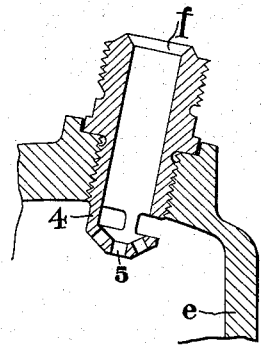
Figure 5:
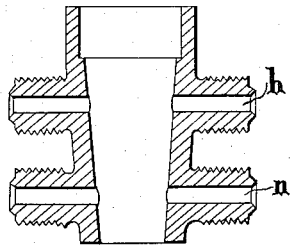
Figure 4:
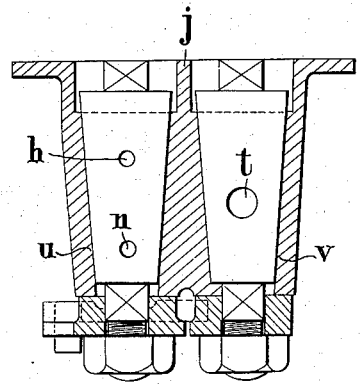
Figure 3:
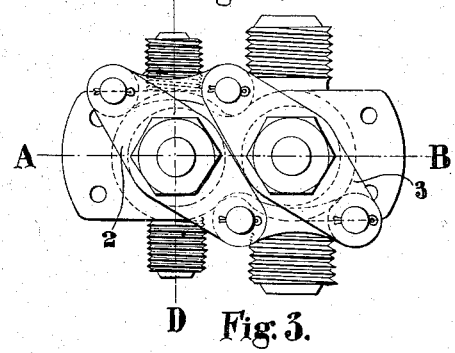

The present invention comprises in the first place deflecting means within the combustion chamber introduced into the path of the air flowing thereto and adapted to direct only a portion of the air into the region of active combustion whereas the residue is directed away from that region preferably toward the walls of the combustion chamber where it effects a cooling of these walls. In this manner the combustion is maintained in a reliable and efficient manner as the excess air does not cause undue cooling of the flame. In order to still further insure reliable and safe action I provide means for effecting a gradual admission of fuel to the combustion chamber at starting, also improved igniting and safety means, but these will be more readily understood from the accompanying drawings in which, Figure 1 is a diagrammatic view showing the arrangement of a plant in accordance with this invention; Fig. 2 shows a modified form of air deflector; Figs. 3 and 4 illustrate one form of the safety cock arrangement which I employ, Fig. 3 being a plan looking from underneath, and Fig. 4 being a section on the line A B Fig. 3; while Fig. 5 is a section on the line C D, of Fig. 3.

In carrying this invention into effect, according to the form shown diagrammatically in Fig. 1, and suitable for an automobile torpedo, air from a storage vessel, $a$, enters a starting valve, $b$, by means of a pipe, $c$, from which valve the air passes to a reducing valve, $d$, and thence past a restricting device, $x$, by which the air pressure is reduced into a combustion chamber, $e$, through a pipe, $f$. In the combustion chamber just opposite the inlet of the air thereto, there is provided a perforated plate, $g$, which acts as a deflector and also serves to split the air up into several streams. Further this screen assists in affecting a reduction in the air pressure which is used for feeding the fuel to the combustion chamber. From the reducing valve, $d$, there is also led a pipe, $h$, which passes through a valve or cock, $j$, hereinafter called the safety cock, and thence by a pipe, $k$, to a closed chamber, $m$, containing a liquid combustible. The liquid combustible does not entirely fill the chamber, $m$, and from the lower end of the chamber or fuel tank, $m$, there leads a pipe, $n$, to the combustion chamber, $e$, where a spraying nozzle, $o$, is provided, the safety cock, $j$, also controls the pipe, $n$.

In this device much of the air entering the combustion chamber is deflected by the deflector so as to pass down by the sides of the combustion chamber in an annular stream, while a portion of the air passes through the perforations in the deflector plate and supports the combustion of the liquid fuel issuing from the nozzle. By this means the walls of the combustion chamber are kept comparatively cool, while no objectionable excess of air is supplied in the neighborhood of the ignited liquid fuel, and the flame is thus maintained at a sufficiently high temperature. The fuel supply to the combustion chamber will also be retarded during a short period after the admission of air to the engine on account of the air space provided in the fuel tank. The purpose of this will be more clearly understood hereafter.

The ignition of the fuel issuing from the nozzle, $o$, is effected by means of a percussion primer. The percussion primer, 6, Fig. 1, is placed in an appropriate holder, $p$, in the outer end of which there is screwed or otherwise held a hollow plug or cylinder, $r$, containing a piston, $q$. One end, $s$, of this piston, viz., the one nearest the primer, 6, may be tapered as in an ordinary percussion striker. The piston is, up to the moment of firing, kept at the further end of the cylinder, $r$, by means of a spring or a spring catch, shearing wire or any other appropriate device may be used. The cylinder is formed in the most convenient way for extracting the primer when it is desired to do so. In the form shown the cylinder, r, within the case, p, is perforated by holes, 7, at its upper end, through which holes the compressed air from the pipe, t, passes. A stop 8, is screwed into the end of the cylinder, r, and an outside cover, 9, is screwed over all. In this way by unscrewing the cover, 9, and withdrawing the cylinder, r, the primer, 6, may be readily changed.

The air supply passage, t, to the striker leads into the cylinder, r, behind the piston, q. In this way when the starting valve, b, is opened compressed air is admitted behind the piston which is thus driven rapidly downward against the action of the spring, z, so that its tapered end strikes the cap of the primer and thus fires it.

Instead of causing the striker to move against a stationary primer the striking pin may be made stationary and the primer arranged to slide.

In order to prevent excessive or sudden ingress of fuel to the combustion chamber, e, which might on ignition produce an excessive increase in pressure, in that chamber, the air supply pipe to the fuel tank is of limited area, while a considerable air space is provided in the fuel tank above the fuel or in a separate vessel connected therewith. In this way the accumulation of air pressure above the fuel is retarded and the starting of the fuel flow into the combustion chamber is somewhat gradual.

The safety cock, j, Figs. 3, 4 and 5, is composed in the form illustrated of two barrels, u and v, articulated together by links, 2 and 3, so that both barrels are moved simultaneously, any other method of articulation may be adopted, however, so long as the three passages, h, n and t, or any two of them are simultaneously controlled. On opening the starting valve it will be seen that no combustion will occur in the chamber, e, unless the safety cock, j, is opened, and it is impossible to start the fuel supply to the combustion chamber without simultaneously starting the igniter, and in all cases a proper interval occurs between the firing of the igniter and the gradual admission of fuel to the combustion chamber.

During the time in which the safety cock is closed the torpedo may be manipulated in a similar way to those torpedoes working without air heating which manipulation would otherwise cause the firing of the primer and cause fuel to gain access to the combustion chamber.

Instead of a single deflecting plate, g, a number of such plates may be employed, or a deflecting nozzle, 4, as shown in Fig. 2, may be used. The deflecting nozzle, 4, is so shaped that only a portion of the air is directed toward the burning fuel. In the form shown the holes at the end of the nozzle direct jets of air toward the jet of liquid combustible while the side holes direct the air jet against the walls of the combustion chamber and away from the fuel jet.

It is found in actual practice that the pipes conveying the air and fuel may sometimes give sufficient retardation of fuel without the employment of a special air space in the fuel flask. The air for the striker may be taken from the combustion chamber, engine pipe or fuel flask as alternatives.

The safety cock is sometimes employed to close merely the two passages controlling the fuel supply, in order to save weight and complication.

Many modifications may be made to the details of the apparatus hereinbefore described. Thus the safety cock may be arranged in one barrel, or in two or three; the form of primer may be altered, and the specific means for deflecting the excess of air from the liquid fuel may be considerably altered without departing from the invention.

What I claim as new and desire to secure by Letters Patent is:—

1. A device for heating compressed air by burning in it a fuel, comprising in combination, a combustion chamber, inlet means for air into said combustion chamber, a deflector situated over the air inlet means and interposed between the fuel inlet means and the air inlet means whereby the main volume of the incoming air is deflected away from the fuel inlet means, said deflector having openings of small area whereby a relatively small quantity of air is passed to support combustion of the fuel issuing from the fuel inlet means.

2. A device for heating compressed air by burning in it a liquid fuel, comprising in combination a combustion chamber, a perforated deflector plate, air inlet means opening on one side of the deflector plate and liquid fuel inlet means opening on the other side, whereby said deflector plate divides the incoming air into two volumes one of which passes along the deflector away from the region into which the fuel inlet opens while the other passes through the perforations toward said region.

3. A device for heating compressed air by burning in it a liquid fuel, comprising in combination a combustion chamber, a deflector consisting of a perforated plate situated at one end of the combustion chamber, said plate leaving around it and between it and the wall of the combustion chamber a restricted passage, an air inlet pipe opening opposite one side of the deflector plate, a fuel nozzle opening into the combustion chamber on the other side of the deflector plate and close to the latter, the main volume of air being directed by the deflector to the restricted passage and thence along the wall of the combustion chamber while the remainder of the air is passed through the perforations to the fuel issuing from the jet.

4. In combination in a device for heating compressed air, a combustion chamber, a compressed air inlet to said chamber, a deflector within said chamber and extending over the opening of the compressed air inlet, a fuel spray nozzle situated in a part of the combustion chamber which is shielded by the deflector from the air issuing from said compressed air inlet and means whereby sufficient air for supporting the combustion of the fuel spray is directed from the main air flow to the spray.

5. In combination in a device for heating compressed air, a combustion chamber, a compressed air inlet to said chamber, a deflector within said chamber and extending over the opening of the compressed air inlet, a fuel spray nozzle situated in a part of the combustion chamber which is shielded by the deflector from the air issuing from said compressed air inlet and means for gradually feeding liquid fuel to said spray nozzle.

6. In combination a combustion chamber, a compressed air inlet, a perforated deflecting plate extending over the opening of said air inlet, fuel supplying means for obtaining combustion in said chamber.

7. In combination a combustion chamber, a compressed air inlet, a perforated deflecting plate extending over the opening of said air inlet, a liquid fuel spray nozzle arranged to spray the fuel into a portion of the deflected air, substantially as hereinbefore described.

8. In an air heating device of the type herein described means for gradually introducing fuel to the combustion chamber comprising a closed fuel tank, a compressed air connection to said fuel tank and offering considerable resistance, an igniter introduced to the combustion chamber, fluid operated means for actuating said igniter and means for admitting operating fluid simultaneously to said fuel tank and igniter operating means.

9. In combination a storage reservoir for compressed air, a pipe leading from said reservoir, reducing and starting valves in said pipe, a combustion chamber, a pipe leading reduced pressure air to said combustion chamber, air deflecting means within said combustion chamber opposite said air inlet, a fuel spray nozzle spraying fuel into a selected portion of said deflected air, means for gradually feeding said fuel to said nozzle and means for igniting said fuel.

10. In an air heating device of the type herein described means for gradually introducing fuel to the combustion chamber comprising a closed fuel tank, a compressed air connection to said fuel tank and offering considerable resistance with means for igniting said fuel introduced to the combustion chamber, means for admitting operating fluid simultaneously to said fuel tank and igniting means, and safety means for cutting out the supply of fuel and the igniting means.

11. In an air heating device of the type herein described a combustion chamber and air supply pipe thereto, a closed fuel storage tank, an igniter, air supply pipes to said fuel tank and igniter, an oil supply pipe from the oil tank to the combustion chamber, simultaneously operated means for controlling at least any two of the said air and oil supply pipes, substantially as and for the purposes described.

12. A device for heating compressed air by burning in it a liquid fuel, comprising in combination a combustion chamber, a compressed air supply reservoir, an air supply pipe connecting said reservoir with the combustion chamber, a reducing valve in said pipe, a closed fuel storage tank, a pipe connecting said fuel tank with a part of the air conduit in which is air at the reduced pressure, a second pipe leading from said fuel tank to said combustion chamber, a deflector within said combustion chamber and situated opposite the opening of the air supply pipe, the opening of the pipe from the fuel tank being situated at the side of the deflector remote from the air inlet.

13. A device for heating compressed air by burning in it a liquid fuel, comprising in combination a combustion chamber, a compressed air supply reservoir, an air supply pipe connecting said reservoir with the combustion chamber, a reducing valve in said pipe, a closed fuel storage tank, a pipe connecting said fuel tank with a part of the air conduit in which is air at the reduced pressure, a second pipe leading from said fuel tank to said combustion chamber, a deflector within said combustion chamber and situated opposite the opening of the air supply pipe, the opening of the pipe from the fuel tank being situated at the side of the deflector remote from the air inlet and restricting means between the reducing valve and the combustion chamber proper acting to cause a reduction of pressure in the combustion chamber whereby a difference of pressure is produced in the oil supply tank for feeding the liquid into the combustion chamber.

14. A device for heating compressed air by burning in it a liquid fuel comprising in combination a combustion chamber, an air supply reservoir, a pipe connecting said reservoir with the combustion chamber, a reducing valve in said pipe, a closed fuel supply tank, a pipe leading air at reduced pressure to the fuel tank, a pipe leading oil from the fuel tank into the combustion chamber, a deflector extending across the combustion chamber between the air inlet and the oil inlet openings and leaving only a restricted passage for the air into the combustion space whereby the pressure in the combustion chamber is further reduced below that existing in the fuel tank.

15. A device for heating compressed air by burning in it a liquid fuel comprising in combination a combustion chamber, an air supply reservoir, a pipe connecting said reservoir with the combustion chamber, a reducing valve in said pipe, a closed fuel supply tank, a pipe leading air at reduced pressure to the fuel tank, a pipe leading oil from the fuel tank into the combustion chamber, a deflector extending across the combustion chamber between the air inlet and the oil inlet openings and leaving only a restricted passage for the air into the combustion space and a restricting device in the air supply pipe acting in conjunction with said deflector to create a reduction of pressure in the combustion chamber whereby the fuel is fed from the fuel reservoir by the difference of pressure between the fuel reservoir and the combustion chamber.

16. A device for heating compressed air by burning in it a liquid fuel comprising in combination a combustion chamber, an air supply reservoir, a pipe connecting said reservoir with the combustion chamber, a reducing valve in said pipe, a closed fuel supply tank, a pipe leading air at reduced pressure to the fuel tank, a pipe leading oil from the fuel tank into the combustion chamber, a deflector extending across the combustion chamber between the air inlet and the oil inlet openings and leaving only a restricted passage for the air into the combustion space whereby the pressure in the combustion chamber is further reduced below that existing in the fuel tank, and a pneumatically operated igniter.

In testimony whereof, I affix my signature in presence of two witnesses.

WILLIAM HORACE SODEAU.

Witnesses:
HENRY HARRISON,
WM. HALL.